KEENEY & TARBOX.
Hay Loader.
No. 12,632.
Patented April 3, 1855.
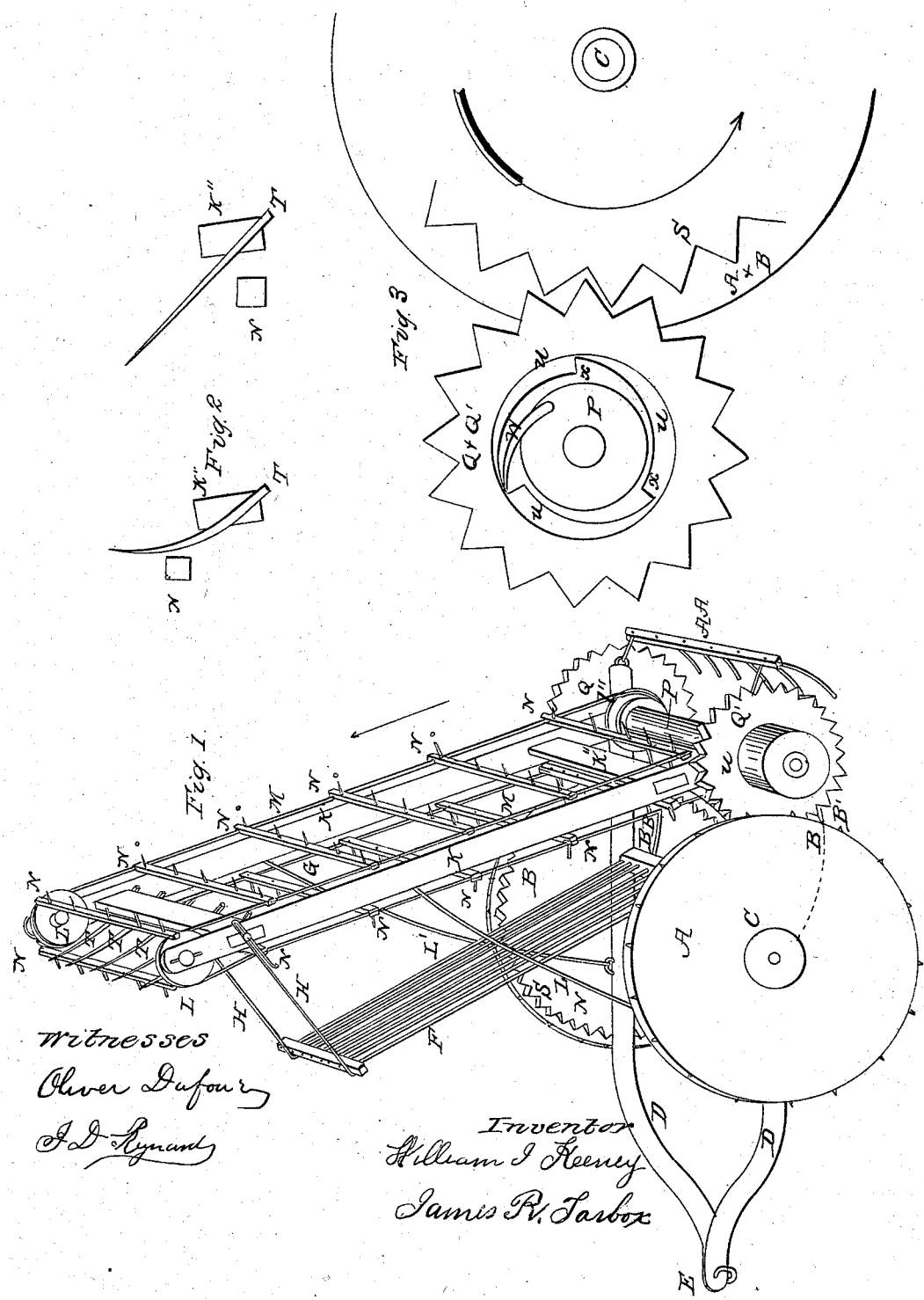

UNITED STATES PATENT OFFICE.

WILLIAM I. KEENEY AND JAMES R. TARBOX, OF SWITZERLAND COUNTY, INDIANA.

IMPROVEMENT IN RAKES AND HAY-ELEVATORS.

Specification forming part of Letters Patent No. 12,632, dated April 3, 1855.

*To all whom it may concern:*

Be it known that we, WILLIAM I. KEENEY and JAMES R. TARBOX, of Switzerland county and State of Indiana, have invented a new and Improved Hay-Elevator; and we do hereby declare that the following is a full and exact description thereof, reference being had to the accompanying drawings, forming part of this specification, in which—

Figure 1 is a perspective view of our elevator; Fig. 2, an illustration of the working of the springs at the top thereof, and Fig. 3 an illustration of the working of the clutches in the pinion.

Similar letters refer to similar parts of the machine.

The nature of our invention consists in a novel combination of an apron, endless belt, and elastic clearers, hereinafter described, either alone or in connection with two driving-wheels provided with clutches and a rake, the whole to constitute a hay raking and elevating machine.

To enable others skilled in the art to make and use our invention, we herewith proceed to describe its construction and operation.

A and B are the supporting and driving wheels, the axle of which, C, rests on or is fixed in the frame D, which by any attachment in E may be appended to a wagon on which the hay is to be elevated. The frame D carries an apron, F, constructed of two light timbers and wire, and is made adjustable as to its distance from the endless belt G by rods H H and set-screws I. In the rear of this apron the frame D carries the elevator proper, G, which consists of a light frame, K K' K'' K''', overreaching in height the apron F, and furnished at the top and bottom with pulleys L L' L'', (the fourth being invisible on the drawings,) around which revolve the endless belts M M', carrying on them the slats N N N, furnished with rake-prongs O O O O. This elevator or endless rake is set in motion by two of the pulleys L being fixed on the axle P, which carries two pinion-wheels, Q Q', the cogs of which play into the tiers of cogs S, provided on the inner sides of the driving-wheels A and B. To the frame-piece K'' is fastened a row of spring-prongs, T, the working of which with regard to the slats N N N passing it is shown in Fig. 2, and from which it follows that when resuming their original position after every passage of a slat N they throw the hay resting on them against apron F, or on the wagon being loaded.

As represented in Fig. 3, the axle P is, at the place where pinions Q Q are fixed upon it, elongated into a hub, U, and furnished with a clutch, W, which, if wheels A and B revolve in the direction of the arrow, falls into the notches X X X X, cut into the hub U, thus carrying axle P and, through said axle, pulleys L L' L'' and the whole endless rake in its revolution, while, one or both of the wheels A and B revolving in an opposite direction, the clutch W slides over the inclined planes of the notched hub U, leaving the axle P, and consequently the endless rake, at rest. Thus it is apparent that only in case it should be necessary to retrograde with the machine, and consequently to interrupt the operation of the endless rake, this latter purpose will be accomplished automatically by the action of the clutches, while every other evolution may be performed with the machine around ponds, bowlders, stumps, trees, &c., the endless rake continually performing its functions, provided only one of the two wheels continues to revolve forward. The elevation of the endless rake may be adjusted to a certain extent by the rods or braces Z Z'.

To the hindermost part of the frame D is secured rake A A, for the purpose of raking toward the endless rake all the hay passed over by it.

B B B B' are fenders placed underneath the frame to protect the pinions and cogs of the driving-wheel.

The machine being set in motion, the distance of the apron from the endless rake and the inclination of the latter are adjusted to suit the weight and quality of the hay, which, as the machine proceeds forward, will be elevated between the apron and the endless rake, whether the motion of the machine be in a straight forward, direction or describing a curve, because in the first case both wheels will revolve forward, and therefore impart movement to the endless belt, and in the second case one of the wheels will revolve forward, and therefore impart movement to the endless belt, while the other, whether standing still or revolving backward, cannot counteract said movement, in consequence of the action of its clutch. Thus the operator will be enabled to use his machine in place of hand-rakes, forks, &c., in places where the hay could not be lifted heretofore but by human hand directly. The clutches being removable, this may be used as a means to disconnect any of the pinions with the shaft P, in order to overcome, if desired, a heavy side draft occasioned on any side of the machine during the operation.

Finally, it is proper to state that our machine, besides working well on uneven and broken ground, will work equally well during windy or stormy weather, except when the wind is "abeam."

What we claim as our invention, and desire to secure by Letters Patent, is—

The combination of the apron F, endless belt M M, and elastic clearers I I, either alone or in connection with two driving-wheels, clutches, and a rake placed behind for the purpose of raking and elevating hay, as set forth.

WM. I. KEENEY.
     JAMES R. TARBOX.

Witnesses:
 ALEX. SCOTT,
 SIMON BEYMER.